No. 675,054. Patented May 28, 1901.
H. S. DURAND.
COUPLING FOR MACHINERY.
(Application filed Oct. 13, 1899.)
(No Model.)

WITNESSES:
D. N. Nayport
Arthur F. Thompson

INVENTOR
Henry S. Durand
BY
Daniel A. Carpenter,
ATTORNEY

UNITED STATES PATENT OFFICE.

HENRY S. DURAND, OF ROCHESTER, NEW YORK.

COUPLING FOR MACHINERY.

SPECIFICATION forming part of Letters Patent No. 675,054, dated May 28, 1901.

Application filed October 13, 1899. Serial No. 733,487. (No model.)

*To all whom it may concern:*

Be it known that I, HENRY S. DURAND, a citizen of the United States, residing at Rochester, in the county of Monroe and State of New York, have invented a certain new and useful Improvement in Couplings for Machinery, of which the following is a full, clear, and exact description, reference being made to the accompanying drawings, forming part of this specification.

This invention relates to improvements in couplings for securing wheels, cranks, and other parts of machinery to shafts; and the invention consists of a coupling comprising the combination, with a shaft and an object mounted thereon, of a peculiar wedge and supplemental fastening, the wedge being in a recess in the shaft and in the eye of the object mounted on the shaft.

Figure 1:
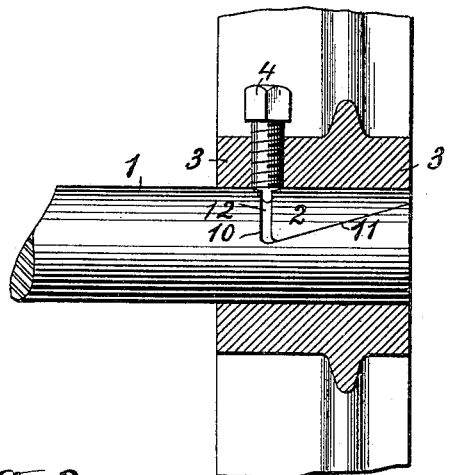
Figure 2:
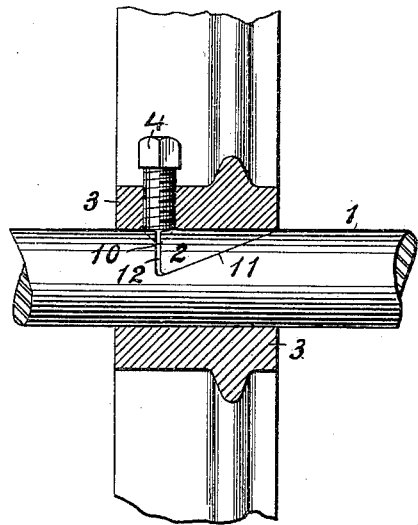
Figure 3:
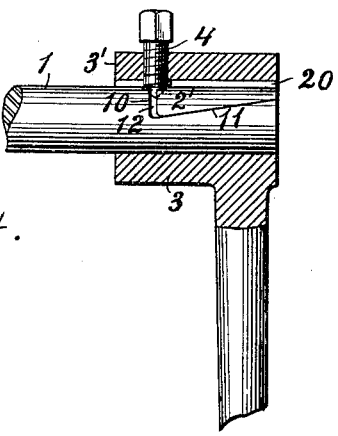

On the accompanying sheet of drawings, Figure 1 is a partly-sectional view showing the wedge and fastening combined with a shaft and with a pulley secured on the shaft at one end thereof; Fig. 2, a like view showing a combination of the wedge and fastening with a shaft and pulley, the shaft extending on both sides of the pulley; Fig. 3, a like view showing the wedge and fastening combined with a shaft and crank; and Fig. 4, an end view of the wedge, shaft, and eye of the crank.

Similar reference-numerals designate like parts in the different views.

This invention affords a simple and positive coupling which is easily produced, as but very little hand labor and little machine-work are required to make it, and which is readily put into or withdrawn from use in a few moments. It is a coupling which may be used not only with pulleys and cranks, but with wheels or other forms—such, for example, as gears, sprockets, and cams—and with various other contrivances that are commonly keyed to shafts.

The recess in the shaft 1 is included between two plane surfaces, which are respectively the end 10 and side 11 of the recess. One side and the thick end of the wedge 2 are flat and the rest of its surface is convex, the curvature being that of the shaft. The flat side of the wedge matches the side 11 of the recess, and the length of the wedge is such that a short space 12 is left between the thick end of the wedge and the end 10 of the recess when the flat side of the wedge is in contact with the side 11 of the recess and the curved surface of the wedge coincides with that of the shaft produced over the recess.

The eye 3 of the object mounted on the shaft closely fits the shaft and extends across the space 12. The supplemental fastening is a device—such, for example, as the screw 4—by which the wedge is tightly fixed between the side 11 of the recess and the inner surface of the eye 3. The screw 4, which has a conical or convex end, extends into the space 12 and exerts pressure on the wedge, the end 10 of the recess and the end of the wedge being grooved or beveled somewhat to provide good bearing-surfaces for the screw. When the screw 4 is driven into the space 12, it forces the wedge 2 from the end 10 and on the side 11 of the recess into firm contact with both the flat surface 11 of the shaft and the interior of the eye 3, the result being that the shaft and the object mounted thereon are securely coupled together.

Figure 4:
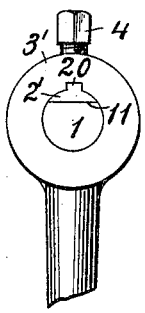

Figs. 3 and 4 show a wedge 2', provided with a fin 20, fitting in a groove in the eye 3' of the crank. The function of the fin is to help prevent the eye from turning on the shaft. In many couplings the fin is not required; but couplings which are to be subjected to especially severe or racking strains are preferably provided with the fin.

The coupling is unfastened by withdrawing the screw 4 from the space 12 and striking that end of the eye which is next to the thin end of the wedge with a hammer to loosen the eye from the wedge and shaft, the wedge being thus forced back into the space 12 and rendered loose in the recess in the shaft.

Having thus described my invention, what I claim as new, and desire to secure by Letters Patent, is—

1. A coupling comprising the combination of: a shaft containing a recess; a wedge fitting loosely in said recess, and having its outer surface curved to correspond to a section of the surface of the shaft; an object mounted on the shaft, and comprising an eye closely surrounding the wedge and shaft; and means for positively locking the shaft, wedge and eye together; substantially as described.

2. A coupling comprising the combination of: a shaft containing a recess having the end 10 and side 11; a wedge fitting loosely in said recess; an object mounted on the shaft, and comprising an eye closely surrounding the wedge and shaft; and a supplemental fastening for locking the shaft, wedge and eye together; substantially as described.

3. A coupling comprising the combination of: a shaft containing a recess having the end 10 and side 11; a wedge fitting loosely in said recess; an object mounted on the shaft and comprising an eye closely surrounding the wedge and shaft; and a screw extending through the wall of the eye and between the thick end of the wedge and the end 10 of the recess; substantially as described.

4. A coupling comprising the combination of: a shaft containing a recess; a wedge fitting loosely in said recess, and having on it a fin 20, and having its outer surface curved on each side of the fin to correspond to a section of the surface of the shaft; an object mounted on the shaft, and comprising an eye closely fitting the wedge and shaft and containing a groove conforming to the fin 20; and means for locking the shaft, wedge and eye together; substantially as described.

5. A coupling comprising the combination of: a shaft containing a recess having the end 10 and side 11; a wedge fitting loosely in said recess, and having on it a fin 20; an object mounted on the shaft, and comprising an eye closely fitting the wedge and shaft and containing a groove conforming to the fin 20; and a screw extending through the wall of the eye and between the thick end of the wedge and the end 10 of the recess; substantially as described.

HENRY S. DURAND.

In presence of—
C. C. MILLER,
WM. J. HANDOVER.